United States Patent [19]

Nakashima et al.

[11] Patent Number: 4,935,135
[45] Date of Patent: Jun. 19, 1990

[54] OIL FILTER

[75] Inventors: Yuzuru Nakashima; Kiyomi Yamamoto, both of Shimonoseki, Japan

[73] Assignee: Al-Flow Co., Ltd., Shimonoseki, Japan

[21] Appl. No.: 111,856

[22] Filed: Oct. 23, 1987

[30] Foreign Application Priority Data

Feb. 25, 1987 [JP] Japan .............................. 62-044011
Feb. 25, 1987 [JP] Japan .............................. 62-144012

[51] Int. Cl.$^5$ ...................... B01D 27/08; B01D 35/02
[52] U.S. Cl. ................................... 210/234; 210/232; 210/238; 210/440; 210/443; 210/450; 210/456
[58] Field of Search ............. 210/167, 168, 232, 238, 210/443, 440, 234, 450, 456

[56] References Cited

U.S. PATENT DOCUMENTS

| | | | |
|---|---|---|---|
| 2,533,192 | 12/1950 | Kennedy | 210/450 X |
| 2,642,188 | 6/1953 | Layte et al. | 210/450 X |
| 3,056,503 | 10/1962 | Roosa | 210/234 |
| 3,275,144 | 9/1966 | Stripp et al. | 210/450 X |
| 3,502,214 | 3/1970 | Mills et al. | 210/234 X |
| 3,608,726 | 9/1971 | Crowther | 210/234 |
| 4,600,512 | 7/1986 | Aid | 210/450 X |
| 4,610,786 | 9/1986 | Pearson | 210/232 X |
| 4,678,572 | 7/1987 | Hehl | 210/232 |

Primary Examiner—Peter Chin
Assistant Examiner—Thi Dang
Attorney, Agent, or Firm—Fleit, Jacobson, Cohn, Price, Holman & Stern

[57] ABSTRACT

An oil filter available for hydraulic fluid circuit of automobiles and machine tools or the like, having a bypass-discharging passage for changing an accommodated filter element for a new one, and a film which surrounds the lower end periphery of the filter element enabling pressure transmission from the hydraulic fluid toward the filter element. The bypass-discharging passage is formed in a fastening bolt which secures a casing and its cover, and when pulling off the fastening bolt, an inlet of the circulated hydraulic fluid directly communicates with a recovery passage, thereby allowing no hydraulic fluid to pass through the filter element in the casing. The film is applied so that the pressure of the hydraulic fluid may be transmitted to the outer periphery of the filter element, causing the density of the wound filter paper to be larger than the upper portion thereof.

2 Claims, 4 Drawing Sheets

OIL FILTER

BACKGROUND OF THE INVENTION

1. Field of the Invention

This invention relates to an oil filter disposed in a hydraulic circuit and adapted for cleaning oil therein.

2. Brief Description of the Prior Art

Ordinally, an injection molding machine, a large machine tool and the like have a hydraulic circuit for use in a hydraulic drive system including a cylinder for moving a table or a hydraulic circuit for lubricating a rotary driving unit. Such a hydraulic circuit is also utilized for automobiles or vehicles with internal combustion engines or diesel engines.

The hydraulic fluid used in such a hydraulic circuit is contaminated by very small particles of extraneous substances while circulating through the circuit. Therefore, an oil filter for filtering and cleaning the working fluid is provided in the circuit so as to maintain the lubricating performance and protect the machine.

The type of oil filter which has generally been used has a construction in which, as shown in FIG. 7, a filter element C formed of a roll of filter paper B is accommodated in a casing A capable of enduring pressure. This type of oil filter also has a port through which hydraulic fluid is introduced and a port (not shown) through which hydraulic fluid is recovered or discharged after filtration, these ports being disposed in a lower portion of the casing A. The hydraulic fluid circulating is thereby filtered through the hydraulic circuit of the machine during working.

Due to the effect of filtration of the hydraulic fluid, extraneous substances which had been contained in the hydraulic fluid stick to the filter element C so that the filter paper B finally loses its filtrating function. It is therefore necessary to change the filter element C at regular intervals by removing a cover (not shown) detachably attached to the casing A.

This operation of changing the filter element is performed after a hydraulic pump of the hydraulic circuit has been stopped. At this time, a certain quantity of hydraulic fluid remains in the casing A. When the cover is opened thereafter, the element C is soaked in the hydraulic fluid. There is therefore a possibility of hydraulic fluid flowing out of the casing A and contaminating the machine or the working floor. It is specifically necessary for an oil filter attached to a precision instrument to be provided with a dedicated leak prevention device if there is such a risk of hydraulic fluid leaking each time the element C is changed. Also the problem of leaking may complicate the changing operation itself.

SUMMARY OF THE INVENTION

It is therefore the first object of the present invention to prevent hydraulic fluid leaking at the time of the operation of changing the filter element so that the operation can be performed without having any bad influence on the machine or related parts.

Besides, when extraneous substances stick to the filter paper B, the hydraulic fluid flows by permeating from the upper end of the element C down to the lower end thereof, thereby causing a phenomenon in which the amount of extraneous substances sticking to an upper portion of the element C is larger than that in a lower portion. Since, in this case, larger particles of extraneous substances can be filtered more easily, extraneous substances having a particle size of, for example, about $3\mu$ are caught and accumulated in an upper portion of the element C while extraneous substances having a particle size of about $0.5\mu$ pass through the upper portion of the element C. Therefore, the distribution of the particle size of extraneous substances caught and accumulated is not uniform in the vertical direction of the element C. It is particularly necessary to capture extraneous substances of a smaller particle size in the lower portion of the element C in order to enable a desired filtering function.

On the other hand, the filter paper B of the element C is wound tight by a uniform winding force, and the density of the filter paper B is uniform even in the vertical direction in which hydraulic fluid passes therethrough. For this reason, even if extraneous substances of a larger particle size can be filtered in an upper portion, extraneous substances of a smaller particle size cannot be captured so long as the density of a lower portion is small. Such a phenomenon is considerable if the casing A is comparatively deep and the length of the path for the hydraulic fluid is large.

As described above, in the element C formed of a roll of the filter paper B wound at a uniform density, a certain amount of extraneous substances is accumulated in an upper end portion in a short period of time, and therefore the interval of replacement of the filter element is shortened. In addition, even if the filtering function is maintained, extraneous substances of a small particle size cannot be adequately captured, and the frequency of replacement of the filter element is also increased in order to maintain the cleanliness of the hydraulic fluid.

It is therefore the second object of the present invention to enable the function of filtering out extraneous substances to be maintained for a long period of time and reduce the frequency of replacement of the filter element by utilizing the pressure of hydraulic fluid so as to change the density of the filter paper of the filter element in the direction of the path for the hydraulic fluid.

To the first end, the present invention provides an oil filter having: a filter element accommodated in a casing with a certain gap between itself and the bottom of the casing; a hydraulic fluid supplying and discharging port formed at the lower end of the casing; a cover for covering the upper end of the casing; a fastening bolt for detachably attaching the cover to the upper end of the casing; a communication passage which is formed in the fastening bolt with an inlet formed at the lower end thereof and through which hydraulic fluid is supplied to one side of the filter element, the lower end of the fastening bolt being screwed into an internally-threaded hole and communication with a hydraulic fluid supply passage formed in the port; and a short-circuit passage opened to the internally-threaded hole and to an internal space of the casing below the filter element so as to communicate with a recovery passage.

To the second end, the present invention provides an oil filter in which a roll of filter paper wound between an inner paper tube and an outer paper tube is disposed in a casing so that the axis of the roll of filter paper extends vertically and in which a hydraulic fluid is upwardly supplied through the inner paper tube and is thereafter discharged downwardly via the filter paper, the oil filter comprising: a gap formed between the outer periphery of the outer paper tube and an inner wall of the casing; a thin film which covers the inner and the outer peripheral surfaces of the lower end of the outer paper tube by its portions in the form of skirts; and a plurality of holes formed in a region of the outer paper tube covered by the film, wherein the pressure of the hydraulic fluid entering via the inner paper tube can be transmitted through the gap between the outer paper tube and the inner wall of the casing and the holes formed in the outer paper tube to the outer peripheral surface of the film facing the inner periphery of the outer paper tube.

In the oil filter in accordance with the present invention, the communication passage for introducing hydraulic fluid through the port into the casing is formed in the fastening bolt for fixing the cover to the casing in which the filter element is accommodated, and the short-circuit passage which short-circuits the supply side and the recovery side without passing through the filter element when the fastening bolt is pulled out is formed in the port. When the fastening bolt is pulled out of the port portion after the pressure of the hydraulic fluid has been reduced by terminating the operation of the motor, the hydraulic fluid is instantly discharged via the short-circuit passage without reaching the filter element, thereby enabling prevention of any inflow of hydraulic fluid to the side of the filter element as well as discharge of residual hydraulic fluid from the casing. As a result, at the time of the operation of changing the filter element, it is possible to change the filter element without any possibility of hydraulic fluid flowing out of the casing and readily perform the operation without contaminating the machine or the peripheral equipment.

In addition, the density of a lower portion of the filter paper is set to be higher than that of an upper portion by utilizing the pressure of hydraulic fluid so as to compress the lower portion of the filter element. It is thereby possible to positively filter and capture even extraneous substances of a small particle size and maintain a high degree of cleanliness of the hydraulic fluid recovered in the circuit. Since extraneous substances of a large size are captured in an upper portion of the filter paper while extraneous substances of a small size are being captured in a lower portion of the filter paper, it is possible to maintain the filtering function which is realized by effectively utilizing the entire part of the filter paper. As a result, the period in which the filter is effectively used can be increased, thereby reducing the frequency of replacement of the filter element.

DETAILED DESCRIPTION OF THE PREFERRED EMBODIMENT

The features of the present invention will be described below more concretely by way of an embodiment of the present invention.

Figure 1:
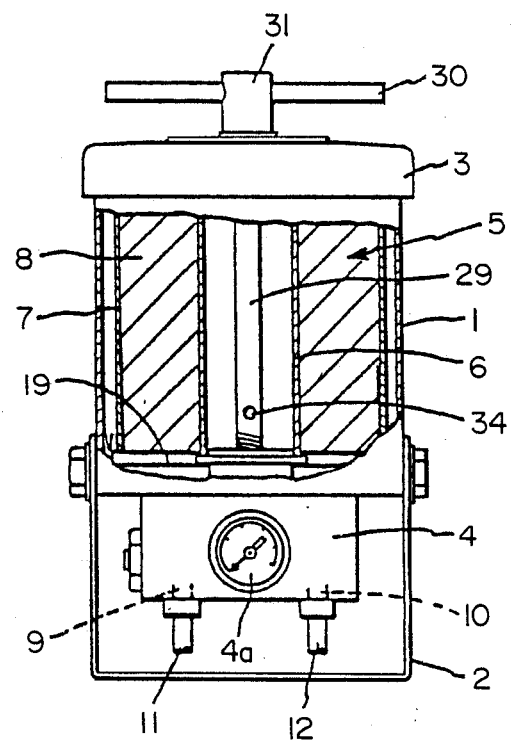
FIG. 1 is a partially cut-away front view of an oil filter which represents an embodiment of the present invention.

FIG. 1 is shows a partially cut-away front view of an oil filter which represents an embodiment of the present invention.

A frame 2 for connecting and fixing a pressure-tight casing 1 to a machine is attached to a lower portion of the casing 1. A cover 3 is detachably attached to the upper end of the casing 1, and a port 4 through which a hydraulic fluid is supplied and discharged is integrally formed at the lower end of the casing 1. A filter element 5 in the form of a roll of paper is accommodated in the casing 1. The element 5 has an inner paper tube 6 disposed at its center and an outer paper tube 7 disposed at its outer periphery, and is formed by winding a sheet of filter paper 8 between these tubes. Hydraulic fluid flows down through the filter paper 8 from the upper end to the lower end thereof.

As shown in FIG. 1, the cap 4 has hydraulic fluid inlet and outlet ports 9 and 10, respectively and hydraulic fluid supply and recovery pipes 11 and 12 are respectively connected to these ports. The cup 4 also has a projection 13 which is integrally formed at the upper end thereof so as to upwardly extend therefrom substantially at the center of the casing 1, as shown in section (a) in FIG. 2. An internally threaded hole 14 is formed in this projection 13. A supply passage 15 which extends from the inlet port 9 is formed so as to communicate with the internally-threaded hole 14. A short-circuit passage 16 extends from the internally-threaded hole 14 and passes through the projection 13 in the radial direction. The outlet port 10 communicates with the internal space of the casing 1 via a recovery passage 17 which opens at its one end to the bottom of the casing 1.

A flange 18 is formed on the outer periphery of the projection 13 in which the internally-threaded hole 14 and the short-circuit passage 16 are formed, and a punching metal 19 which is supported at its center by the flange 18 is disposed at a position higher than the short-circuit passage 16. An annular projection 20 for supporting the outer peripheral edge of the punching metal 19 is formed on the inner wall of the casing 1, and an edge 21 for receiving the element 5 on the annular projection 20 by contacting the element 5 on a line is formed on the upper surface of the annular projection 20. Yet, it is not always necessary to form the edge 21.

Figure 3:
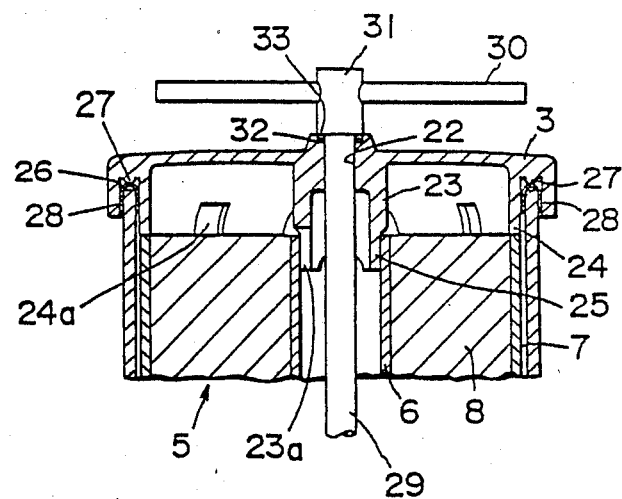
FIG. 3 is an enlarged cross sectional view of a cover.

As shown in FIG. 3, the cover 3 has an opening 22 formed through a central portion of the cover, and an annular inner peripheral rib 23 and an annular outer peripheral rib 24 which are formed on the bottom side of the cover 3 which downwardly press the inner paper tube 6 and the outer paper tube 7, respectively. The inner peripheral rib 23 has a stepped portion 25 formed at its lower end, which is inserted into the inner paper tube 6 when the rib supports the element. These inner and outer peripheral ribs 23 and 24 are provided with notches 23a and 24a which are formed at desired intervals so that the inner paper tube 6 and the outer paper tube 7 are uniformly pressed downward. Projections 27 are formed in an annular groove 26 between the outer peripheral rib 24 and the outer peripheral wall of the cover 3 over the entire periphery extending downward. The projections 27 function to increase the sealing pressure which is applied to a packing member 28 disposed in the annular groove 26 so as to effect sealing on the upper end of the casing 1.

The cover 3 is integrally attached to the casing 1 by a fastening bolt 29 which is inserted through the opening 22 of the cover 3 and screwed into the internally-threaded hole 14 formed in the projection 13. The fastening bolt 29 has its upper end a bar 30 so that it displays a T-shaped configuration. A lower portion of a head 31 formed at the upper end of the fastening bolt acts to seal the surface of the cover 3 around the opening 22 with a packing member 32 and a washer 33 interposed therebetween.

Figure 2A:
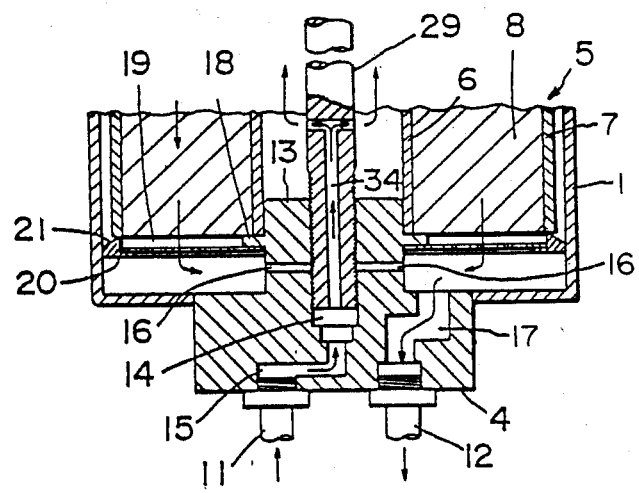
FIGS. 2(a) and 2(b) are enlarged cross-sectional views of a port portion in which flows of hydraulic fluid are shown.

A communication passage 34 through which the hydraulic fluid flows is formed near the lower end of the fastening bolt 29 so as to extend from the lower end thereof in the axial direction, as shown in FIG. 2. The length of this communication passage 34 is determined so that, as shown in FIG. 2(a), the upper end of the passage is higher than the projection 13 when the fastening bolt is completely screwed into the internally-threaded hole 14.

In the above-described construction, the cover 3 is securely fixed to the casing 1 by inserting the fastening bolt 29 through the opening 22 of the cover 3 and screwing this bolt into the internally-threaded hole 14 after the element 5 has been accommodated in the casing 1. At this time, the inner paper tube 6 and the outer paper tube 7 of the element 5 is pressed downward by the inner peripheral rib 23 and the outer peripheral rib 24 formed on the lower surface of the cover 3, thereby enabling the element 5 to be stably supported even under high pressure of hydraulic fluid. Furthermore, the element 5 is maintained to be stable against vibration which occurs in a machine or an automobile to which the casing is secured. The packing member 28 for effecting sealing between the upper end of the casing 1 and the lower surface of the cover 3 is locally pressurized by the projections 27 formed in the annular groove 26 of the cover 3. It is thereby possible to increase the sealing pressure applied to the packing member 28 so that there is no possibility of the hydraulic fluid leaking through the sealed portion between the casing 1 and the cover 3.

As described above, when the cover 3 is integrally attached to the casing 1, the fastening bolt 29 is screwed to a position lower than the short-circuit passage 16, as shown in FIG. 2(a), so that the short-circuit passage is closed. As a result, the hydraulic fluid flows from the supply passage 15 through the communication passage 34 in the direction indicated by the arrow in FIG. 2(a) and is discharged into the internal space of the inner paper tube 6 of the element 5. The hydraulic fluid thereafter rises through the inner paper tube 6, enters into the filter paper 8 from the upper side thereof, passes through the punching metal 19 while being filtered, and is finally discharged via the recovery passage 17 into the recovery pipe 12, thus circulating through the hydraulic circuit of the machine.

Figure 2B:
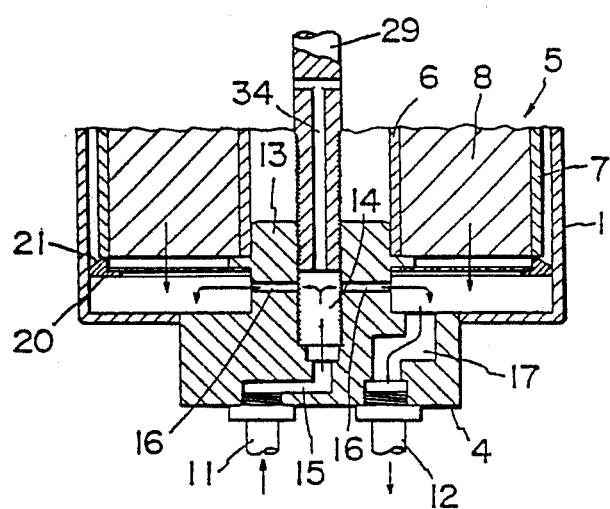

On the other hand, when the element 5 is changed, the operation of the hydraulic pump of the hydraulic circuit is stopped so as to reduce the pressure of the hydraulic fluid flowing into the casing 1, thereby enabling the operation of removing the cover 3 to be performed. To perform this operation, the fastening bolt 29 is pulled out of the internally-threaded hole 14 and is moved upward, as shown in FIG. 2(b). The fastening bolt 29 is then moved so that the lower end thereof becomes higher than the level of the short-circuit passage 16 formed in the projection 13, thereby providing a communication between the supply passage 15 and the short-circuit passage 16. At this time, the hydraulic pressure of the hydraulic fluid is reduced so that there is no quantity of hydraulic fluid newly flowing into the casing 1, and a quantity of hydraulic fluid remaining in the casing 1 passes through the punching metal 19 and is discharged via the recovery passage 17. A quantity of hydraulic fluid flows from the supply passage 15 into the casing 1 by the effect of residual pressure of the hydraulic circuit, but it does not reach the upper end of the communication passage 34 of the fastening bolt 29 because the level of residual pressure is small, so that it flows directly through the short-circuit passage 16 into the space below the punching metal 19. Therefore, a quantity of hydraulic fluid which newly enters is directly discharged in the direction of the recovery pipe 12 without reaching the element 5. To confirm the reduction in the pressure of the hydraulic fluid, a pressure gauge 4a for detecting and displaying the hydraulic pressure in the supply passage 15 may preferably be disposed at the cap 4.

As described above, when the fastening bolt 29 is pulled out of the internally-threaded hole 14, in order to remove the cover 3, the hydraulic fluid can be discharged by being directly bypassed to the passage on the recovery side without flowing into the accommodation space of the element 5. Therefore, when the cover 3 is removed, there is no hydraulic fluid remaining above the level of the punching metal 19, and hence there is no possibility of the hydraulic fluid flowing and dropping out of the oil filter when the element 5 is drawn out. During this operation, there is no risk of the machine itself or the place therearound being contaminated by hydraulic fluid, the oil filter in accordance with the present invention is particularly suitable for use in a precision instrument or the like which requires the maintenance of a desired state of environment in which the instrument is installed.

It has already been noted that, at the upper end of the element 5 accommodated in the casing 1, the inner and outer paper tube 6 and 7 are pressed downward by the inner and outer peripheral ribs 23 and 24 formed on the lower surface of the cover 3 so that the element 5 can be maintained at a predetermined position even under the high pressure of the hydraulic fluid. Besides this feature, the annular projection 20 for supporting the punching metal 19 is disposed on the side of the bottom of the casing 1, and the edge 21 for receiving the lower end of the outer paper tube 7 is formed on the projection 20. Since this edge 21 supports the lower end surface of the outer paper tube 7 by contacting this tube on a line, it allows for a high sealing pressure to the hydraulic fluid which passes through the filter paper 8. Therefore, the hydraulic fluid which has not been filtered, namely which stagnates in the gap between the outer periphery of the outer paper tube 7 and the inner wall of the casing 1, is prevented from flowing to the recovery passage 17.

In addition, as shown in FIG. 3, the shape and the capacity of the cover 3 are determined so that a space is formed between the upper end of the element 5 and the cover 3 when the element is accommodated. If the space which encloses air above the element 5 is comparatively large, it is possible for this space to function as an accumulator for the hydraulic fluid by utilizing the compressibility of air. That is, the pressure of the hydraulic fluid varies over a wide range in response to the load on the machine to which the oil filter is adapted, and it is possible to provide the same effect as that of a type of accumulator used in an ordinary hydraulic circuit by utilizing the compressibility of air so as to accumulate such variation. It is also possible to absorb an abrupt change in the internal pressure of the circuit by the effect of compression and expansion of the air, thereby suitably functioning as a damper. Further, since such a damper effectively suppresses the change of the internal pressure of the casing, the filtration flow rate of the hydraulic fluid through the element 5 is constant. Subsequently, particles captured by this element will not flow out to the discharging path.

In the example shown in the drawings, the hydraulic fluid is filtered in only one casing 1, but a plurality of casing 1 arranged parallel may be used if the flow rate of hydraulic fluid is increased in accordance with the type of machine to which the oil filter is adapted.

Figure 4:
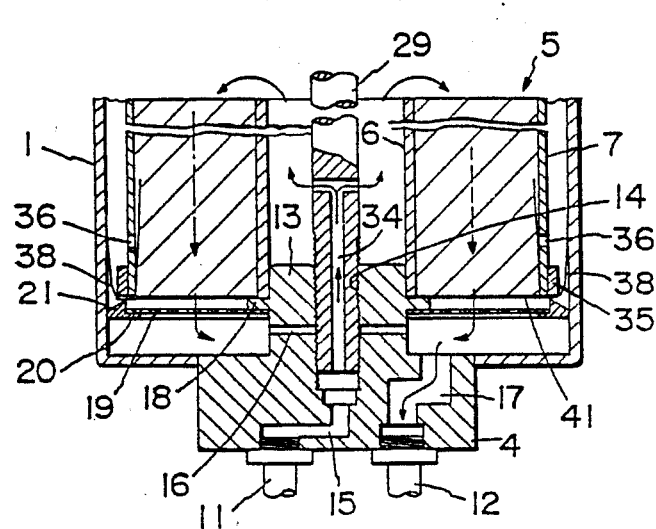
FIG. 4 is a longitudinal sectional view of a lower portion of the filter with a film disposed at the lower end of a filter element.
Figure 5:
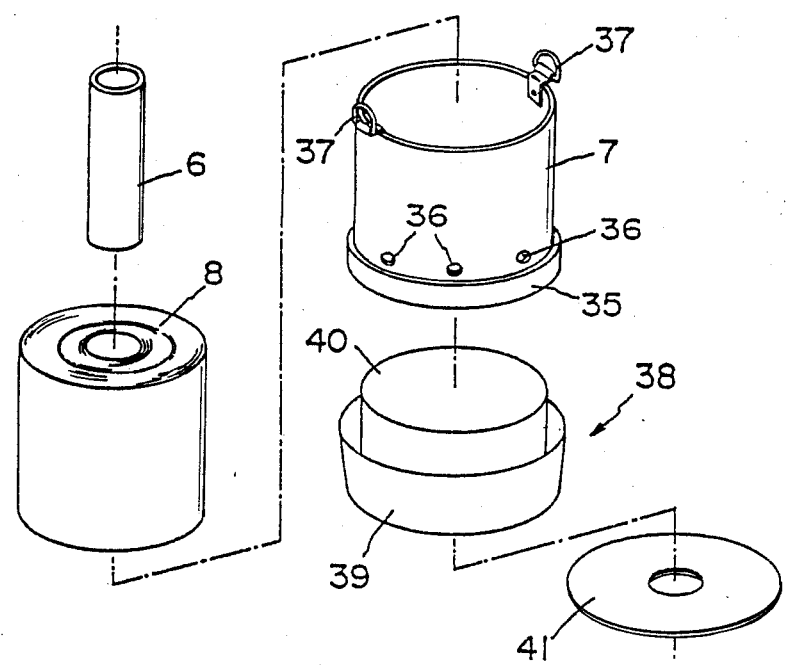
FIG. 5 is an exploded perspective view of a filter element.
Figure 6:
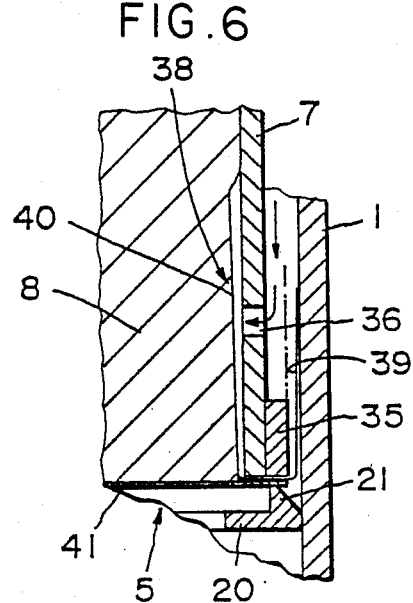
FIG. 6 is an enlarged longitudinal sectional view of illustrating a deformation of a film at a lower end of an outer paper tube of the filter element.
Figure 7:
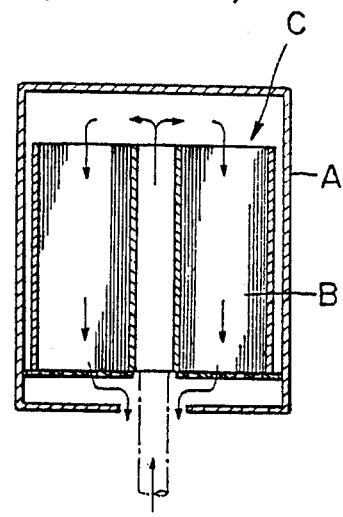
FIG. 7 is a schematic cross sectional view of a conventional oil filter.

FIG. 4 to FIG. 6 show the second invention. In these Figures, the short-circuit passage 16 and the recovery passage 17 disposed at the cap 4, and the communication passage 34 formed in the fastening bolt 29 are provided as well, and the discharging system of the hydraulic fluid is performed in an entirely similar manner to the aforementioned embodiment. Numbers indicated in FIGS. 1-3 also apply to FIGS. 4-6.

FIG. 5 shows an exploded perspective view of the element 5 in which the construction of the roll of filter paper 8 is integrally provided in a annular space formed between the inner paper tube 6 and the outer paper tube 7, as described above.

A spacer 35 which also serves as a reinforcement member is integrally wound around the lower end of the outer periphery of the outer paper tube 7, thereby forming a stepped portion on the peripheral surface. The outer paper tube 7 has a plurality of holes 36 formed above the spacer 35 at regular intervals in the circumferential direction, and a pair of hooks 37 attached to its upper end which are used to remove the filter element from the casing 1. A thin film 38 made of polypropylene or the like having portions in the form of skirts is integrally attached to a lower portion of the outer paper tube 7. This film 38 has a tubular shape with its lower end outwardly turned over. As shown in an enlarged view of the lower end of the outer paper tube 7 in FIG. 4, when the film 38 is fitted into the outer paper tube 7, the edge of an outer extension 39 is positioned so as to be higher than the holes 36, and an inner extension 40 extends to a position higher than the outer extension 39. The inner and outer paper tubes 6 and 7 and the filter paper 8 together with the film 38 are integrally assembled, and a mat 41 formed by using a material capable of permitting the hydraulic fluid to permeate or pass therethrough sticks to the bottom surface.

The element 5 with the film 38 attached to the lower portion thereof is accommodated into the casing 1 in a manner that the lower surface of the mat 41 is mounted onto the edge 21. The cover 3 is securely fixed to the casing 1 by screwing the fastening bolt 29 into the internally-threaded hole 14.

Then, when the hydraulic fluid to be filtered is supplied through the supply pipe 11, the hydraulic fluid flows from the supply passage 15 through the communication passage 34 in the direction indicated by the arrow in FIG. 4 and is discharged into the internal space of the inner paper tube 6 of the element 5. The hydraulic fluid thereafter rises through the inner paper tube 6, enters into the filter paper 8 from the upper side thereof, passes through the punching metal 19 while being filtered, and is finally discharged via the recovery passage 17 into the recovery pipe 12, thus circulating through the hydraulic circuit of the machine.

When the operation of supplying the hydraulic fluid is commenced, a part of a quantity of hydraulic fluid remaining at the upper end of the casing 1 flows, into the filter paper 8, and another part of this hydraulic fluid flows to the outside of the outer paper tube 7 through the plurality of notches 24a formed in the outer peripheral rib 24 of the cover 3 so that it flows into the gap between the outer paper tube 7 and the inner wall of the casing 1. This quantity of hydraulic fluid flowing into this space acts to outwardly deform the outer extension 39 of the film 38 as shown in FIG. 6. That is, the spacer 35 facilitates the formation of a gap between the outer extension 39 and the peripheral wall of the outer paper tube 7, so that the hydraulic fluid flows so as to enter into this gap, move the outer extension 39 from the position indicated by the chain line in FIG. 6 and press the extension in the direction of the inner wall of the casing 1. Therefore, the outer extension 39 closely contacts with the inner wall of the casing 1, thereby sealing this portion against the hydraulic fluid which flows from above and preventing the hydraulic fluid from flowing down along the inner wall of the casing 1 into the recovery passage 17 formed below.

The hydraulic fluid acts to deform the outer extension 39 in this manner and, at the same time, it flows into the outer paper tube 7 through the hole 36 and enters into the filter paper 8 by way of the upper edge of the inner extension 40 after moving along the outer surface thereof. Since, at this time, the hydraulic fluid flows under a large pressure, the inner extension 40 is loaded with an external pressure by the hydraulic fluid so that it acts to compress the filter paper 8 encircled by it in the direction of the center of the filter paper 8. Therefore, the filter paper 8 is deformed by the external compressing force so as to reduce the diameter thereof, as shown in FIG. 6. As a result, the density of the filter paper 8 in a region thereof encircled by the inner extension 40 in the vertical direction becomes higher than that of an upper portion.

As described above, it it possible to set the density of a lower portion of the paper filter 8 to be higher by utilizing the pressure of the hydraulic fluid after starting the operation of supplying the hydraulic fluid into the casing 1. It is therefore possible to positively filter and capture even extraneous substances of a small particle size such as those mentioned above in the brief description of the prior art, which pass through the filter paper 8 from above to the bottom thereof.

It is possible for an upper portion of the filter paper 8 to filter extraneous substances of a large particle size, while extraneous substances of a small particle size are caught and accumulated in a lower portion. It is therefore possible to filter the hydraulic fluid at high efficiency no matter what the size of extraneous substances and effectively use the entire part of the element 5, thereby increasing the interval between periodic replacement.

Instead of the application of the spacer 35, the hole 36 may have the shape thereof be long to the vertical direction enough to include the upper level end of the outer extension 39. In this construction, the hydraulic fluid from above the outer extension 39 acts so that the outer extension 39 contacts to the inner wall of the casing 1 as well, thereby increasing the load of the external pressure to the filter paper 8.

We claim:

1. An oil filter comprising:

a filter element having an annular cross-section accommodated in a casing with a gap located between said filter element and a bottom of said casing, a cap located at the bottom of said casing, said cap having hydraulic fluid supplying and discharging parts, a cover detachably disposed on an upper end of said casing, a fastening bolt for detachably attaching said cover to said upper end of said casing, said fastening bolt vertically penetrating through said cover and said filter element to said bottom of said casing, a communication passage formed in said fastening bolt with an inlet formed at a lower end of said fastening bolt and through which hydraulic fluid is supplied to an annular flow channel defined between said filter element and said fastening bolt, said lower end of said fastening bolt being screwed into an internally-threaded hole of said cap and communicating with said hydraulic fluid supply port in said cap, and a short-circuit passage in said cap communicating between said internally-threaded hole and said gap, said short-circuit passage having an opening to an inner periphery of said internally-threaded hole and having a horizontal axis, and said opening of said short-circuit passage being either opened or closed when said fastening bolt moves upward or downward respectively.

2. An oil filter comprising:

a roll of filter paper wound between an inner paper tube and an outer paper tube in a casing, an axis of said roll of filter paper and paper tubes being approximately vertical, a lower end of said inner paper tube communicating with a supply passage from a hydraulic fluid circuit, an upper end of said inner paper tube communicating with an upper end of said roll of filter paper, a lower end surface of said roll of filter paper communicating with a discharge passage to said hydraulic fluid circuit, hydraulic fluid is upwardly supplied through said inner paper tube and is thereafter discharged downwardly via said filter paper, a gap formed between an outer peripheral surface of said outer paper tube and an inner wall of said casing, a fluid pressure deformable thin film covering said outer peripheral surface and an inner peripheral surface of a lower end of said outer paper tube in the form of skirts, and a plurality of holes formed in a region of said outer paper tube being covered by said thin film, wherein the pressure of said hydraulic fluid entering via said inner paper tube is transmitted through said gap between said outer paper tube and said inner wall of said casing and said plurality of holes formed in said outer paper tube and extending to an outer peripheral surface of said thin film facing said inner peripheral surface of said outer paper tube.

* * * * *